United States Patent
Ohsawa et al.

(10) Patent No.: US 7,266,129 B1
(45) Date of Patent: Sep. 4, 2007

(54) COMMUNICATION LINE CONTROL SYSTEM

(75) Inventors: Noriyuki Ohsawa, Kawasaki (JP); Isamu Kitagawa, Kawasaki (JP); Munetaka Sakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 09/661,737

(22) Filed: Sep. 14, 2000

(30) Foreign Application Priority Data

Nov. 4, 1999 (JP) .................................. 11-313927

(51) Int. Cl.
*H04J 3/16* (2006.01)
(52) U.S. Cl. ....................................... 370/437; 370/463
(58) Field of Classification Search ................ 370/437, 370/438, 439, 449, 462, 463
See application file for complete search history.

(56) References Cited

U.S. PATENT DOCUMENTS

| | | | | |
|---|---|---|---|---|
| 4,958,343 A | * | 9/1990 | Abramovici et al. ........ | 370/439 |
| 5,241,601 A | * | 8/1993 | Naito et al. ................. | 370/447 |
| 5,278,836 A | * | 1/1994 | Iimura et al. ............... | 370/464 |
| 5,696,817 A | * | 12/1997 | Yatsu ......................... | 379/252 |
| 5,898,668 A | * | 4/1999 | Shaffer ....................... | 370/230 |
| 5,974,044 A | * | 10/1999 | Ikeda et al. ................. | 370/354 |
| 6,005,847 A | * | 12/1999 | Gilbert et al. .............. | 370/264 |
| 6,128,293 A | * | 10/2000 | Pfeffer ........................ | 370/359 |
| 6,567,418 B1 | * | 5/2003 | Farah ......................... | 370/437 |

FOREIGN PATENT DOCUMENTS

| | | |
|---|---|---|
| JP | 7-95637 | 4/1995 |
| JP | 7-99501 | 4/1995 |
| JP | 9-321763 | 12/1997 |

* cited by examiner

*Primary Examiner*—Chau Nguyen
*Assistant Examiner*—Christine Ng
(74) *Attorney, Agent, or Firm*—Katten Muchin Rosenman LLP

(57) ABSTRACT

A communication line control system and a communication line control method have an architecture, in which if a plurality of calls that should be processed simultaneously occur in one communication terminal incorporating communication functions containing voice communications and data communications and accommodating a plurality of communication lines, a distributed control module utilizing the plurality of communication lines on this communication terminal processes only a specified call among the plurality of calls on the basis of condition data preset in a line control unit without being aware of the plurality of communication lines. With this architecture, it is feasible to enhance a general-purposed characteristic and a simplicity of creation of the software (distributed control module) for controlling the plurality of communication lines, reduce a load thereof and improve its usability.

5 Claims, 9 Drawing Sheets

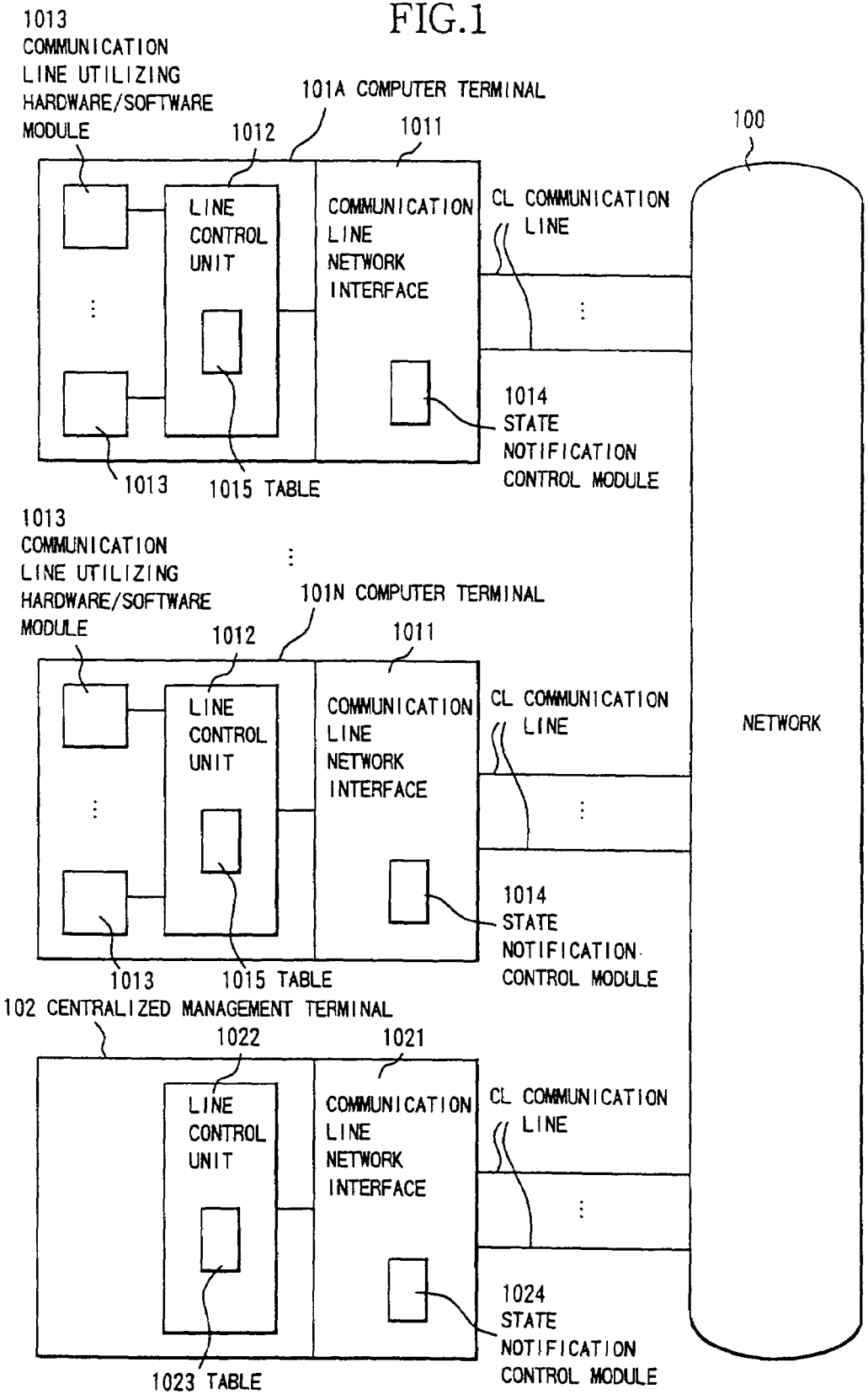

FIG.2

1015 (1023) COMMUNICATION CONTROL MANAGEMENT TABLE

<LINE TABLE>

| LINE NUMBER | STATE | CONTROLLER | TENTATIVE STATE FLAG (F) | TERMINAL PRIORITY | GROUP | MANAGEMENT MODE | MEDIA |
|---|---|---|---|---|---|---|---|
| LINE 1 | RESPONDING | TERMINAL 2 | 0 | 1 > 2 > 3 > 4 | 1 | DISTRIBUTED MODE | VOICE |
| LINE 2 | RECEIVING CALL | TERMINAL 1 | 0 | 2 > 3 > 1 | 1 | DISTRIBUTED MODE | VOICE |
| LINE 3 | FREE | | 0 | | 1 | DISTRIBUTED MODE | DATA |
| LINE 4 | FREE | | 0 | 5 > 4 | 1 | DISTRIBUTED MODE | FAX |
| LINE 5 | RESPONDING | TERMINAL 3 | 1 | 2 > 3 > 4 | 2 | CENTRALIZED MODE | VOICE |

<TERMINAL TABLE>

| TERMINAL NUMBER | LINE USER | STATE | CONTROL TARGET | TENTATIVE STATE FLAG (F) | GROUP | MANAGEMENT MODE | MEDIA | CONNECTION LINE PRIORITY |
|---|---|---|---|---|---|---|---|---|
| TERMINAL 1 | SOFTWARE 11 | RECEIVING CALL | LINE 2 | 0 | 1 | DISTRIBUTED MODE | VOICE | 3 > 2 > 1 |
| | SOFTWARE 12 | FREE | | 0 | ③ | CENTRALIZED MODE | DATA | 3 |
| TERMINAL 2 | SOFTWARE 21 | RESPONDING | LINE 1 | 1 | 1 | DISTRIBUTED MODE | VOICE | 1 > 2 > 5 |
| TERMINAL 3 | SOFTWARE 31 | TALKING | LINE 5 | 0 | 1 | DISTRIBUTED MODE | VOICE | 2 > 5 > 1 |
| TERMINAL 4 | SOFTWARE 41 | STOP | | 0 | 1/2 | DISTRIBUTED MODE/ CENTRALIZED MODE | VOICE/FAX | 4 > 5 |
| TERMINAL 5 | SOFTWARE 51 | FREE | | 0 | ② | CENTRALIZED MODE | FAX | 4 |

NUMERALS WITH ○ IN "GROUP" INDICATE CENTRALIZED MANAGEMENT TERMINALS

COMMUNICATION LINE CONTROL SYSTEM

BACKGROUND OF THE INVENTION

The present invention relates to a communication line control system including a plurality of communication terminals (communication terminal devices) each incorporating communication functions containing voice communications and data (facsimile) communications and accommodating a plurality of communication lines connected to a network. The present invention relates also to a communication line control method of controlling the plurality of communication lines in one single communication terminal, and of processing a communication on the same communication line between the plurality of communication terminals.

With diversified needs, there have been provided services for making a plurality of communication lines controllable in one single communication terminal. For example, when telephone calls occur simultaneously, an arbitrary call can be responded by allocating the line per button in a telephone terminal connected to a button telephone system or a private branch exchange (PBX).

Further, there are actualized services for increasing an operation efficiency of a telephone transfer of the call dealt with by the telephone terminal by sharing with other terminals.

On the other hand, the data dealt with by a computer terminal serving as a communication terminal are also diversified, and one computer terminal is capable of operating communications, facsimile communications, etc. other than the data communications. There are provided services and a system (Internet telephony system) incorporating a function schemed to attain more of usability by utilizing the telephone services in the computer terminal such as a personal computer (PC) by fusing the above communication functions.

For attaining the services described above, however, it is required that hardware and software (application) using the communication lines in the computer terminal be aware (such as judging which line is used for response when the plurality of calls arrive) of the number of the communication lines and data (a telephone number, etc.) of each communication line and so on.

This, however, conduces to a problem in terms of decline of simplicity in creating the software and a general-purposed characteristic to other systems due to an increase in processing load of the software and to a difference in the number of lines connected to the terminals.

Further, in the case of sharing the communication lines with other computer terminals, a conflict with other terminals might arise, and hence the software needs a process to obviate the conflict, with the result that the same problems as those described above occur.

Moreover, even if the software using the communication line in an arbitrary terminal or the terminal itself falls into an abnormal state, and if consistency with the communication lines can not be taken, the terminal is incapable of responding irrespective of a state of the terminal or the software when, e.g., telephone calls occur. This leads to a decline of respondency of the telephone.

SUMMARY OF THE INVENTION

Accordingly, it is a primary object of the present invention to provide a communication lien control system and a communication line control method that are capable of enhancing a general-purposed characteristic and a simplicity of creation of the software (distributed control module) for controlling a plurality of communication lines, reduce a load thereof and improve its usability.

To accomplish the above object, according to a first communication line control method of the present invention comprises a step of providing one communication terminal device incorporating communication functions containing voice communications and data communications, and accommodating a plurality of communication lines connected to a network, a step of providing a distributed control module for utilizing the plurality of communication lines on the communication terminal device, and a step of causing, if a plurality of calls occur on a plurality of lines that should be simultaneously processed in the communication terminal device, the distributed control module to process only a specified call as a control target among the plurality of calls on the basis of condition data preset in a line control unit without being aware of the plurality of communication lines.

A second communication line control method of the present invention comprises a step of providing a plurality of communication terminal devices each incorporating communication functions containing voice communications and data communications, and accommodating a plurality of communication lines connected to a network, a step of providing a centralized management communication terminal device, a step of causing, if the plurality of communication terminal devices are capable of controlling the same call through communication lines corresponding thereto, a line control unit of the centralized management communication terminal device to notify of a state of the call a specified communication terminal device among the plurality of communication terminal devices and to acknowledge the control by the specified communication terminal device so that only the specified communication terminal device as a control-acknowledged terminal device processes the same call on the basis of condition data, and a step of causing a distributed control module of the specified communication terminal device to avoid a conflict about the same call between the plurality of communication terminal devices that utilize the communication lines.

A third communication line control method of the present invention, based on the first or second method, may further comprise a step of notifying the line control unit of a change in state by an indication given from the distributed control module with respect to the call of which the line control unit notifies the distributed control module, a step of changing the condition data about the call control in the line control unit, and a step of changing a control target condition and a notifying target condition with respect to the plurality of calls.

A fourth communication line control method of the present invention comprises a step of providing a plurality of communication terminal devices each incorporating communication functions containing voice communications and data communications, accommodating a plurality of communication lines connected to a network, and capable of controlling an arbitrary call, a step of causing, if the plurality of communication terminal devises forming a plurality of groups and when a control request with respect to a specified call is made on an arbitrary communication terminal device within one group or when a state of the call changes, a line control unit of the arbitrary communication terminal device to give broadcasting notifications of a change in control reservation state with respect to the specified call to the line control units of the plurality of communication terminal devices within other groups, a step of causing the line control unit of the arbitrary communication terminal device, after receiving acknowledgements about the control reservation state from the line control units, having received the broadcasting notifications, of the communication terminal devices within other groups, to give a right of control of the call to a distributed control module of the arbitrary communication terminal device that utilizes the communication lines, and a step of causing the distributed control module of the arbitrary communication terminal device to execute exclusive control between the communication terminal devices within other groups by unifying the states about the specified call between the communication terminal devices of other groups without being aware of the communication lines.

A fifth communication line control method of the present invention comprises a step of providing a plurality of communication terminal devices each incorporating communication functions containing voice communications and data communications, accommodating a plurality of communication lines connected to a network, and capable of controlling an arbitrary call, a step of setting one arbitrary communication terminal device as a centralized management communication terminal device of which a line control unit manages in centralization other communication terminal devices, a step of allocating, when controlling a specified call by other communication terminal devices, a right of control to other communication terminal devices by the centralized management communication terminal device on the basis of preset condition data, and a step of causing a distributed control module of the arbitrary communication terminal device to execute exclusive control between other communication terminal devices that utilize the communication by unifying the states about the specified call between other communication terminal devices without being aware of the communication lines.

A sixth communication line control method of the present invention, based on the fourth or fifth method, may further comprise a step of monitoring a processing load within the self communication terminal device and a load on the communication line in the line control unit of each of the communication terminal devices or in the line control unit of the centralized management communication terminal device, and a step of managing a plurality of calls by switching over a mode of the line control in the line control unit of each of the communication terminal devices or in the line control unit of the centralized management communication terminal device on the basis of the condition data preset corresponding to a state of this load.

A seventh communication line control method of the present invention comprises a step of providing a plurality of communication terminal devices each incorporating communication functions containing voice communications and data communications, and accommodating a plurality of communication lines connected to a network, a step of notifying, if there occurs a change in state of one arbitrary communication terminal device, of this state the line control unit of other communication terminal device from an interface of the one arbitrary communication terminal device that has a function of operating with an independent power supply, a step of updating a condition table in the line control unit of other communication terminal device, and a step of executing the line control related to the communication terminal device exhibiting the change in state.

A first communication line control system of the present invention comprises a communication terminal device incorporating communication functions containing voice communications and data communications, and the communication terminal device includes a line control unit for determining, if there occur a plurality of calls that should be simultaneously processed on a plurality of communication lines connected to a network, a specified call as a control target call among the plurality of calls on the basis of preset condition data, and a distributed control module for processing only the specified call determined by the line control unit without being aware of the plurality of communication lines.

A second communication line control system of the present invention comprises a plurality of communication terminal devices each incorporating communication functions containing voice communications and data communications, and accommodating a plurality of communication lines connected to a network, and a centralized management communication terminal device including a line control unit for determining, if the plurality of communication terminal devices are capable of controlling the same call through corresponding communication lines, a specified communication terminal device as a control-assigned terminal device among the plurality of communication terminal devices with respect to the same call on the basis of preset condition data, and notifying the specified communication terminal device of a state of the call and acknowledging the control thereof so that only the specified communication terminal device processes the same call.

A third communication line control system of the present invention comprises a plurality of communication terminal devices each incorporating communication functions containing voice communications and data communications, accommodating a plurality of communication lines connected to a network, and capable of controlling an arbitrary call. If the plurality of communication terminals form a plurality of groups and when a control request with respect to a specified call is made on an arbitrary communication terminal device within one group or when a state of the call changes, a line control unit of the arbitrary communication terminal device gives broadcasting notifications of a change in control reservation state with respect to the specified call to the line control units of the plurality of communication terminal devices within other groups, the line control unit of the arbitrary communication terminal device, after receiving acknowledgements about the control reservation state from the line control units, having received the broadcasting notifications, of the communication terminal devices within other groups, gives a right of control of the call to a distributed control module of the arbitrary communication terminal device that utilizes the communication lines, and the distributed control module thus executes exclusive control between the communication terminal devices within other groups.

A fourth communication line control system of the present invention comprises a plurality of communication terminal devices each incorporating communication functions containing voice communications and data communications, accommodating a plurality of communication lines connected to a network, and capable of controlling an arbitrary call. When a line control unit of one arbitrary communication terminal device manages in centralization other communication terminal devices, the centralized management communication terminal device allocates, in the case of controlling a specified call by other communication terminal devices, a right of control to other communication terminal devices on the basis of preset condition data, and a distributed control module of the arbitrary communication terminal device utilizing the communication lines executes exclusive control between the communication terminal devices by unifying the states about the specified call between other communication terminal devices without being aware of the communication lines.

A fifth communication line control system of the present invention comprises a plurality of communication terminal devices each incorporating communication functions containing voice communications and data communications, and accommodating a plurality of communication lines connected to a network. If there occurs a change in state of one arbitrary communication terminal device, an interface of the one arbitrary communication terminal device that has a function of operating with an independent power supply gives a notification of a state to line control units of other communication terminal devices, condition tables are updated in the line control units of other communication terminal devices, and the line related to the communication terminal device exhibiting a change in state is controlled.

According to the present invention, the line control unit of the communication terminal such as a computer terminal accommodating the plurality of communication lines and incorporating the telephone functions (the voice communication function, controls the plurality of lines with respect to the call or the line to be used among the plurality of lines. The distributed control module (software, i.e., application) utilizing the communication lines within the terminal is therefore capable of dealing with the plurality of communication lines virtually as one single line on the whole. Hence, the software can be created in an easy manner, and a general-purposed to other systems can be enhanced.

Further, according to the present invention, when the specified line is shared with other terminal, though a processing conflict needs to be obviated, the plurality of communication lines are processed in concealment by the line control unit and therefore need not to be aware of, whereby the creation of the software can be simplified.

Moreover, according to the present invention, if the software and the terminal fall into an abnormal state, the communication control can be dynamically changed, and it is therefore possible to operate without any trouble in operations such as responding to telephoning.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which:

FIG. 1 is a block diagram showing an architecture of a communication line control system in one embodiment of the present invention;

FIG. 2 is a chart showing a detailed structure of a communication control management table;

DETAILED DESCRIPTION OF THE PREFERRED EMBODIMENTS

Figure 3:
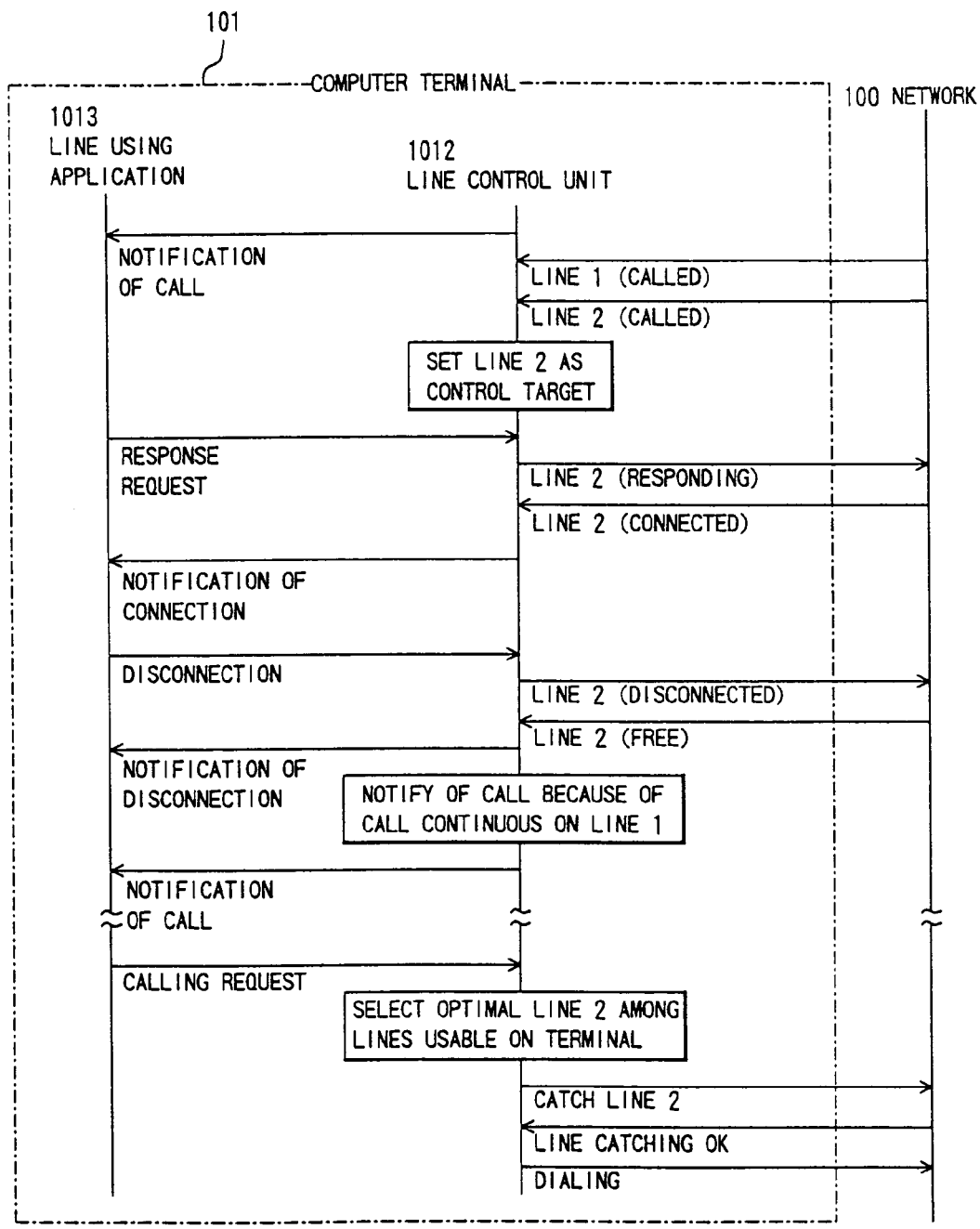
FIG. 3 is an explanatory sequence chart showing an operational example 1.

Next, embodiments of the present invention will hereinafter be described with reference to the accompanying drawings.

ARCHITECTURE OF COMMUNICATION LINE CONTROL SYSTEM

FIG. 1 illustrates an architecture of a communication line control system in one embodiment of the present invention. Referring to FIG. 1, this control system is constructed of a network 100 for providing communication lines CL for communications and a plurality of computer terminals 101 (101.A . . . , 101.N) which accommodate the plurality of communication lines CL.

Each of the computer terminals 101 includes a communication line network interface 1011 for accommodating the communication line CL, a line control unit 1012 for controlling the communication line network interface 1011, and a plurality of communication line utilizing hardware/software modules (distributed control modules) 1013 for each receiving an indication from the user through a keyboard and mouse, and for using the communication line CL via the line control unit 1012.

The line control unit 1012 performs communications with a line control unit 1012 of other terminal, and has a function of transmitting and receiving information. The communication line network interface 1011 includes a state notification control module 1014 for transmitting a piece of state notification data about an abnormal state of the terminal concerned and receiving transmission data from other terminals, and incorporates a function capable of operating by power supply different from a power source for operating the computer terminal 101.

Further, in the case of executing a centralized management of the communication control, a centralized management terminal 102 is used. The centralized management terminal 102 includes a communication line network interface 1021 that accommodates the communication lines CL, and a line control unit 1022, and has a function of transmitting and receiving the data between the respective computer terminals 101. In the centralized management terminal 102, the network interface 1021 has likewise a state notification control module 1024.

The line control unit 1012 or 1022 has a communication control management table 1015 or 1023 for determining the communication line utilizing hardware/software module 1013 for controlling a call with respect to every computer terminal 101, whereby an attribute (a right of control, etc.) related to the call on the communication line CL with the computer terminal 101 is determined depending on conditions such as a state of the terminal, a state of control software and so on. Then, the communication controllable by each of the computer terminals 101 becomes what the line control unit 1012 or 1022 has determined, and the communication line utilizing hardware/software module 1013 or the user may simply do line control (call response, etc.) without being aware of calls on the plurality of lines CL.

FIG. 2 shows one example of the communication control management table 1015 or 1023 provided in each line control unit 1012 or 1023.

OPERATIONAL EXAMPLE 1

Next, an operational example of the communication line control system in one embodiment of the present invention shown in FIG. 1, will be described.

Referring to FIGS. 1, 2 and 3 in combination, the plurality of communication lines CL are connected to each computer terminal 101. When the communications (calls) occur at the same time on the plurality of lines, a specified communication line utilizing hardware/software module (a communication line utilizing application) 1013 determines a control target line on the basis of conditions (a priority of every line number, media information, and a category of the communication line utilizing software in boot) within the communication control management table 1015 defined as a preset condition table in the line control unit 1012 of the computer terminal 101, and only this hardware/software module 1013 is notified of a state of the line.

Further, with respect to a control request (the call response, etc.) given from the hardware/software module 1013, the line determined to be a control target is to be controlled. The communication line utilizing hardware/software module 1013 executes respective processes (a response request, a disconnection request, a hold request) in response to the effective calls without being aware of the line that should be controlled, and, if the communications (calls) exist simultaneously on the plurality of lines, the line control unit 1012 judges the control target line (call) and implement actual control of the network 100.

Further, if the communication occurs on other line when the control target communication disappears, it is feasible to re-notify of this occurred communication as a control target call.

To describe it in greater details, the plurality of lines CL of the network 100 are connected to an arbitrary computer terminal 101, and it is assumed that telephone calls now occur on lines CL (1 and 2) almost simultaneously. When the call occurs ahead on the line 1, the communication line utilizing hardware/software module 1013 is notified of the call. At this time, the line 1 is set as the control target line, and [Control Target] of the [Terminal 1] within the terminal table is set to [Line 1].

Next, if a call occurs on the line 2, the communication line utilizing hardware/software module 1013 has already been notified of the call when the call existed on the line 1 and therefore needs not to be re-notified of that call. If judging that the call on the line 2 has a higher priority referring to [Line Priority] in the terminal table of the communication control management table 1015, however, a function within the line control unit 1012 sets the control target line (or call) to the line 2, and sets [Control Target] of the [Terminal 1] in the terminal table to [Line 2].

Thereafter, the communication line utilizing hardware/software module 1013 issues a response request, and, after the line control unit 1012 has received this request, performs a response operation to the line 2 with respect to the network 100. The communication line utilizing hardware/software module 1013 is thereby capable of making the response to an optimal call without being aware of the plurality of lines CL.

Thereafter, if the call on the line 1 continues at an end of the speech to the line 2, the communication line utilizing hardware/software module 1013 comes to a state of being capable of responding to the line 1 and is therefore re-notified of the call on the line 1 from the line control unit 1012.

On the other hand, a sequence of making a telephone call is that when the line control unit 1012 receives a calling request from the communication line utilizing hardware/software module 1013 (particularly from software 11), a line for [Voice] is distinguished from [Media] with reference to the line table of the line control unit 1012, using lines are determined in sequence based on [Line Priority] after lines connected to the self-terminal among them have been extracted out of the terminal table, the line 2 is then selected as an optimal line CL, and the telephone calling request is made with respect to the network 100 by use of the line 2. In this case also, without the communication line utilizing hardware/software module 1013 specifying the line for calling, the line control unit 1012 is capable of automatically choosing the optimal communication line CL, whereby the telephone call can be made.

OPERATIONAL EXAMPLE 2

Figure 4:
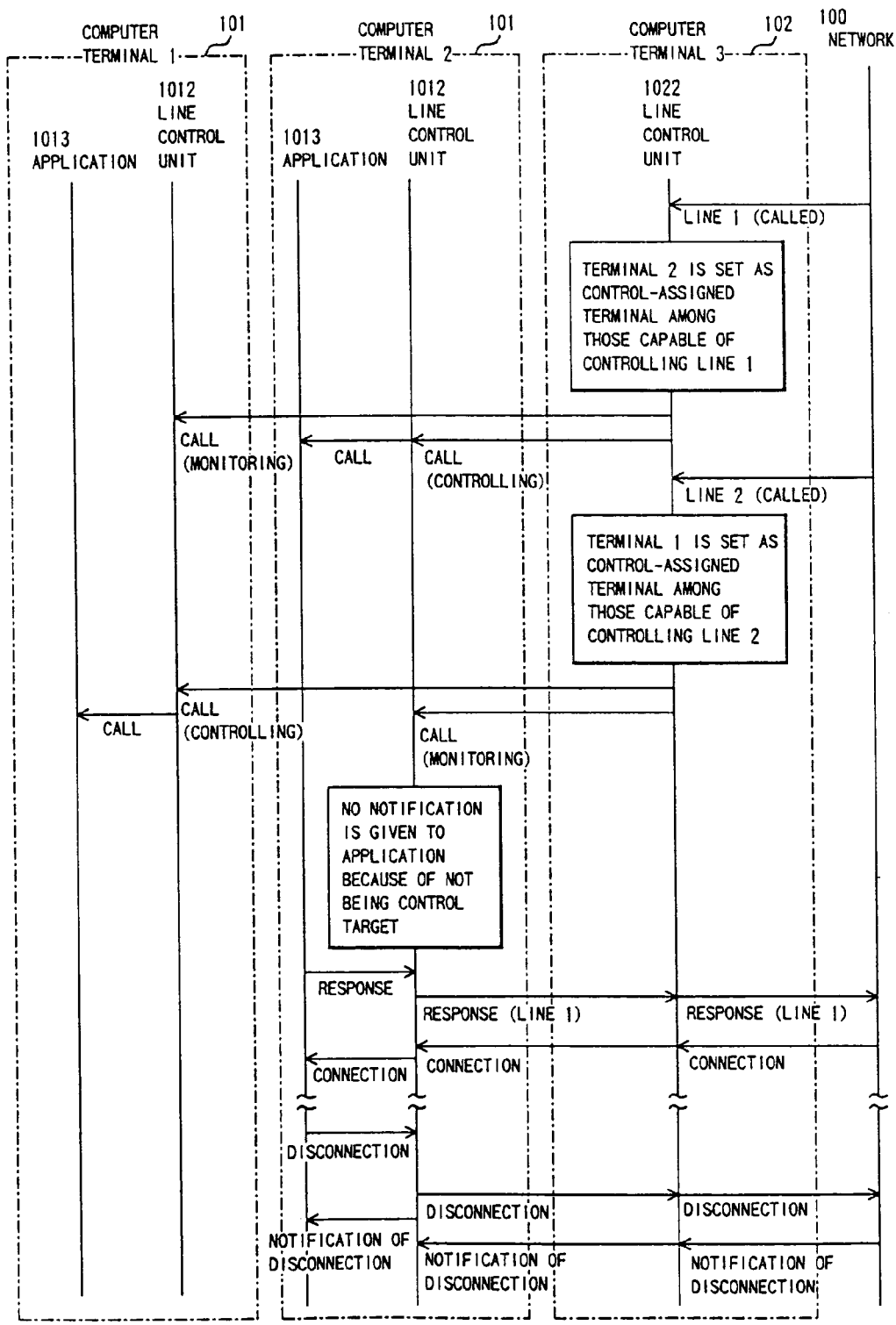
FIG. 4 is an explanatory sequence chart showing an operational example 2.

Next, referring to FIGS. 1, 2 and 4 in combination, in a case where the communication occurs on one arbitrary line CL and this line CL is controllable by a plurality of computer terminals 101, a control-assigned computer terminal 101 among the plurality of computer terminals 101 is determined based on conditions (the priorities given to the respective terminals with respect to that line, the media information and states of the terminals) in the preset table (any one of the tables 1015 and 1023 may be chosen) in the line control unit (any one of the units 1012 and 1022 may be selected), and only the thus determined computer terminal 101 is notified of a state of the communication.

Further, the control oriented to the network 100 is also effected by a combination of the above-determined computer terminal 101 and the control target line. The communication line utilizing hardware/software module 1013 executes the respective processes (the response request, the disconnection request, the hold request and so forth) with respect to the calls effective to the self-terminal without being aware of the lines that should be controlled. Moreover, if there has already existed the control target communication in the computer terminal 101 determined to be given a top priority due to a time deviation of occurrence of the communication, the communication control may also be transferred to other terminal, depending on the operational condition in the table (1015 or 1023), and a newly control-assigned terminal is capable of controlling the call concerned without being aware of the plurality of communications.

A physical connection of the line to be controlled in this operation is not a matter of importance, and, for example, if not physically connected to a certain computer terminal 101, the line can be controlled through a logical connection (such as a multi-line function in a button telephone system).

Describing it in greater details, if the communication line CL having the same telephone number is connected to each of the plurality of computer terminals 101 (1 and 2), it is presumed that a telephone call occurs on the line 1. In this case, the arbitrary computer terminal 101 (3), i.e., the line control unit 1022 of the centralized management terminal 102 controls the lines of the computer terminals 1 and 2.

The line control unit 1022 of the computer terminal 3 sets the computer terminal 2 as an optimal computer terminal that should respond on the basis of [Terminal Priority] in the line table of the communication control management table shown in FIG. 2, and notifies of the call the line control unit 1012 of the computer terminal 2. As a route of this notification there may be utilized LAN or PBX of which illustrations are omitted, or 2B+D control channels via the network 100.

In this case, a notification of the call may be given directly to the communication line utilizing hardware/software module 1013 of the computer terminal 2 from the line control unit 1022 of the computer terminal 3 (irrespective of whether or not the computer terminal 2 has the control line unit). If the computer terminals 1, 2 have the line control units 1012, the line control unit 1012 of the computer terminal 1 may be notified of the call. In this case, however, only the line control unit of the control-assigned computer terminal is notified of controllable parameters added, while the line control unit of the other computer terminal is notified of the controllable parameters as values for monitoring.

In such a case, in the line control unit of the computer terminal that has been notified of the values for monitoring, the communication line utilizing hardware/software module 1013 within the self-terminal is not notified of the call. While on the other hand, in the line control unit of the control-assigned computer terminal that has been notified of the call, the communication line utilizing hardware/software module 1013 within the self-terminal is notified of the call.

According to this operational example, if the call occurs on the line 2 simultaneously with the occurrence of the call on the line (not yet in a response state), in the line control unit 1022 of the computer terminal 3, the same judging module as the one when the call occurred earlier on the line 1 with respect to the computer terminal assigned to control the line 2, sets the terminal 1 and notifies of the call the line control unit 1012 of the computer terminal 1. The communication line utilizing hardware/software module 1013 within each computer terminal issues only the response request without being aware of the line that should be responded to, and a speech state thus occurs.

OPERATIONAL EXAMPLE 3

Figure 5:
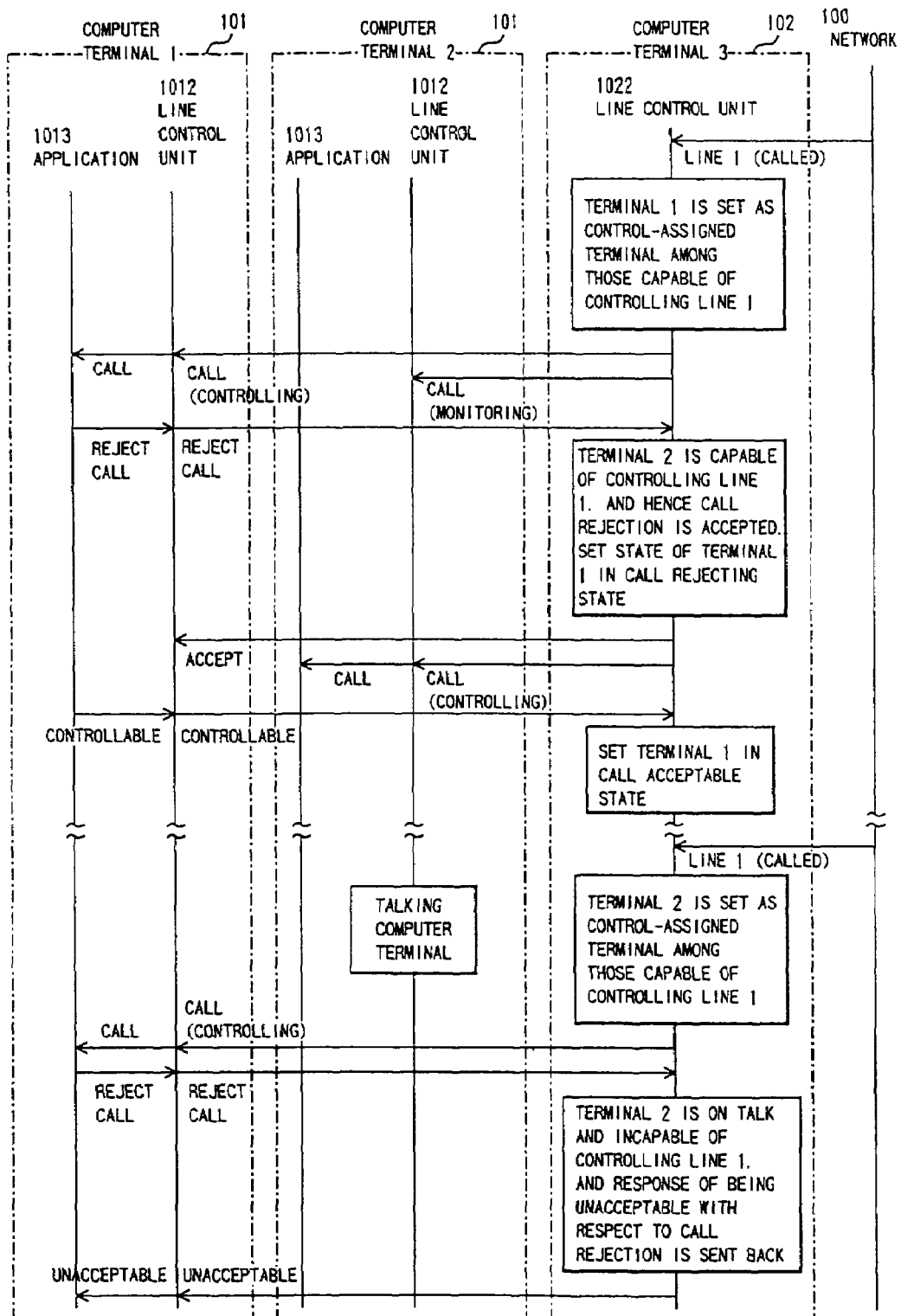
FIG. 5 is an explanatory sequence chart showing an operational example 3.

Next, an operational example 3 will be explained referring to FIGS. 1, 2 and 5 in combination. In the operational examples 1 and 2 described above, in cases where the control-assigned communication line utilizing hardware/software module 1013 transfers the call to other terminal and where the control is transferred to other communication line utilizing hardware/software module 1013 (which is irrespective of belonging to the self-terminal or other terminal in this case) for the reason of an impossible-of-response state in the self-terminal (such as when the software comes to an end), the line control unit (1012 or 1022) is notified of a change instate.

Further, when becoming the controllable state, similarly, the line control unit (1012 or 1022) is notified of the change in state. With this notification, the line control unit (1012 or 1022) rewrites the table (1015 or 1023) and dynamically changes the line control with respect to the control assigned computer terminal.

The configuration of the lines connected to the respective computer terminals is the same as that in the operational example 2. To describe it in farther depth, the line control unit 1022 of the computer terminal 3 sets the computer terminal 1 as a control-assigned terminal when the call occurs on the line 1, and the communication line utilizing hardware/software module 1013 of the computer terminal 1 is notified of the call in the same sequence as that in the operational example 2.

At this time, the communication line utilizing hardware/software module 1013 of the computer terminal 1 may transmit an indication equal to a call refusal to the line control unit 1022 of the computer terminal 3 via the line control unit 1012 of the computer terminal 1. Then, the computer terminal 1 is ruled out as a computer terminal assigned to control the line 1 from the table 1023 in the line control unit 1022 of the computer terminal 3, and this item of the table 1023 is reset. In this case, if the line control unit 1012 or 1022 of the computer terminal 1 or 3 judges that there are no other control-assigned computer terminals, a response of being unacceptable may be given to the request of the call refusal.

OPERATIONAL EXAMPLE 4

Figure 6:
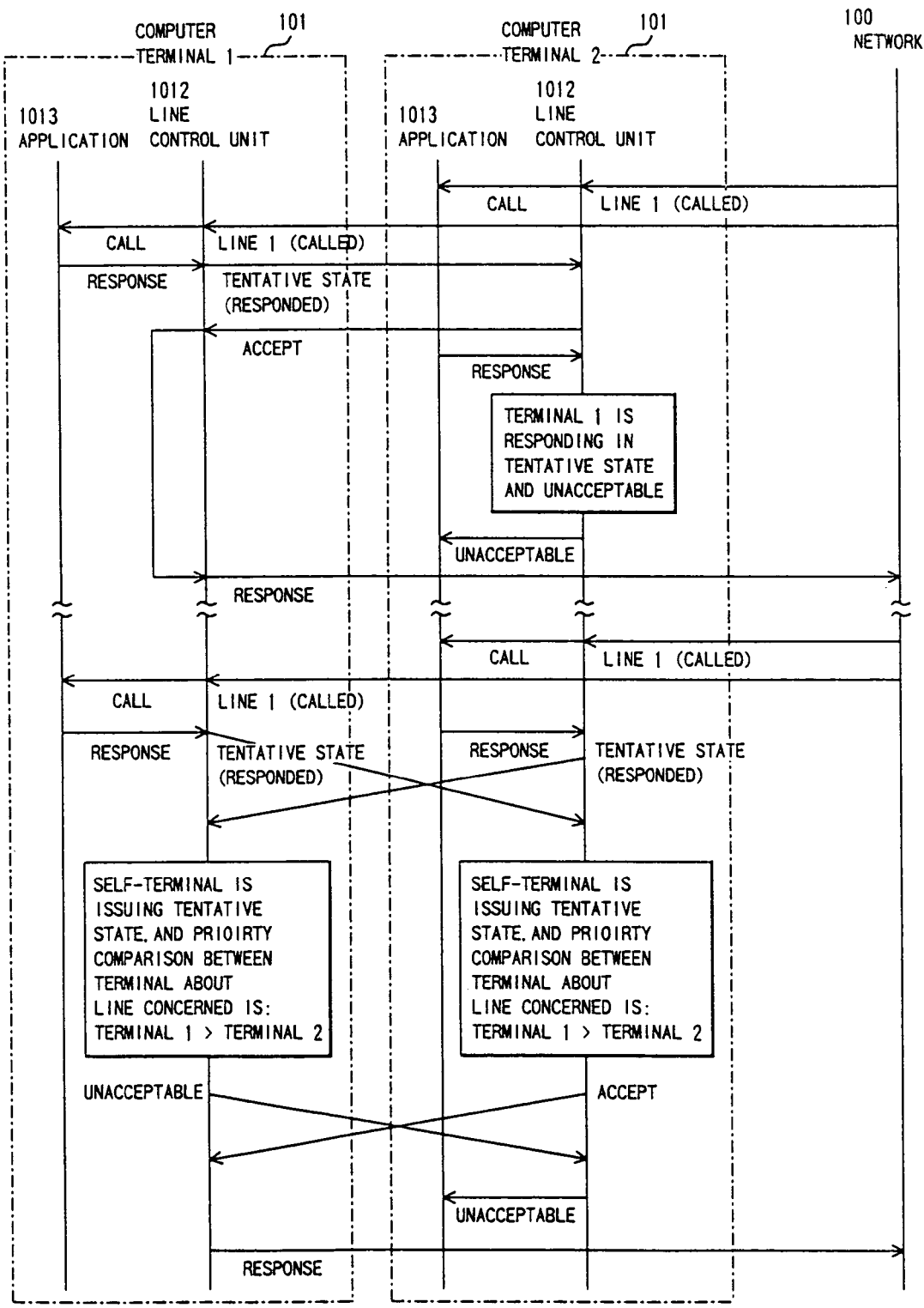
FIG. 6 is an explanatory sequence chart showing an operational example 4.

Next, an operational example 4 will be explained referring to FIGS. 1, 2 and 6 in combination. When the plurality of computer terminals 101 control the same line, there occur between the computer terminals 101 time-lags and differences in contents of items of information (a call state, call data) of this line, of which the notification is given from the side of the communication line CL. The line control unit 1012 in each computer terminal 101, however, sends a tentative notification of the state to the line control unit 1012 in other computer terminal 101, and the receiving side waits for a state as a tentative state.

The control oriented to the network 100 is actually done with a response to the notification of the tentative state. This makes it feasible to avoid the processing conflict from between the plurality of terminals because of a state reservation being made as a tentative state before actually executing the control oriented to the network 100.

In a mode of determining which communication line utilizing hardware/software module 1013 is given the right of controlling a specified line among the respective terminals as well as in a case of not using this mode (a processing authority is equal between the terminals), exclusive control to obviate a processing conflict is executed by taking synchronism between the line control units 1012 in the computer terminals 101 with respect to synchronous processes for the same communication.

To explain it in greater details, the configuration of the lines connected to the respective computer terminals is the same as that in the operational example 2. Further, an architecture in this operational example 4 is that there is no terminal corresponding to the computer terminal 3 for conducting the centralized management in the operational examples 2 and 3.

Now, if the call occurs on the line 1, the line control units 1012 of the computer terminals 1, 2 are notified of the call from the network 100. In this case, the line control unit 1012 of each terminal notifies the self-terminal communication line utilizing hardware/software module 1013 of the call.

The communication line utilizing hardware/software module 1013 of the computer terminal 1 makes a response request at this time, the line control unit 1012 of the computer terminal 2 is notified of [Tentative State (response state)] as a state of the line 1 via the self-terminal line control unit 1012, and [1] is set in [Tentative State Flag (F)] in the terminal table.

Thereafter, if a control request is given to the line control unit 1012 of the computer terminal 2 from the communication line utilizing hardware/software module 1013 in the computer terminal 2, an impossible-of-response-state is judged from [Tentative State F] and [State], and a response of being uncontrollable is given.

The line control unit 1012 of the computer terminal 2 notifies of an accept response the line control unit 1012 of the computer terminal 1, and thereafter the line control unit 1012 of the computer terminal 1 performs a response operation to the network 100.

In this case, if having already received a tentative state request from the communication line utilizing hardware/software module 1013 within the self-terminal at a point of time when the line control unit 1012 of the computer terminal 2 receives a notification of the tentative state from the computer terminal 1, the line control unit 1012 of the computer terminal 1 may be notified of an unacceptable response. In this case, the line control unit 1012 of the computer terminal 1 does not issue an indication of response control of the line 1 to the network 100, and notifies the self-terminal communication line utilizing hardware/software module 1013 of being impossible of response.

If there arises a conflict in reservations of the tentative state notifications that are simultaneously made by the plurality of terminals, the processing is executed based on the priorities given beforehand to the respective terminals as the preset item of information.

OPERATIONAL EXAMPLE 5

Figure 7:
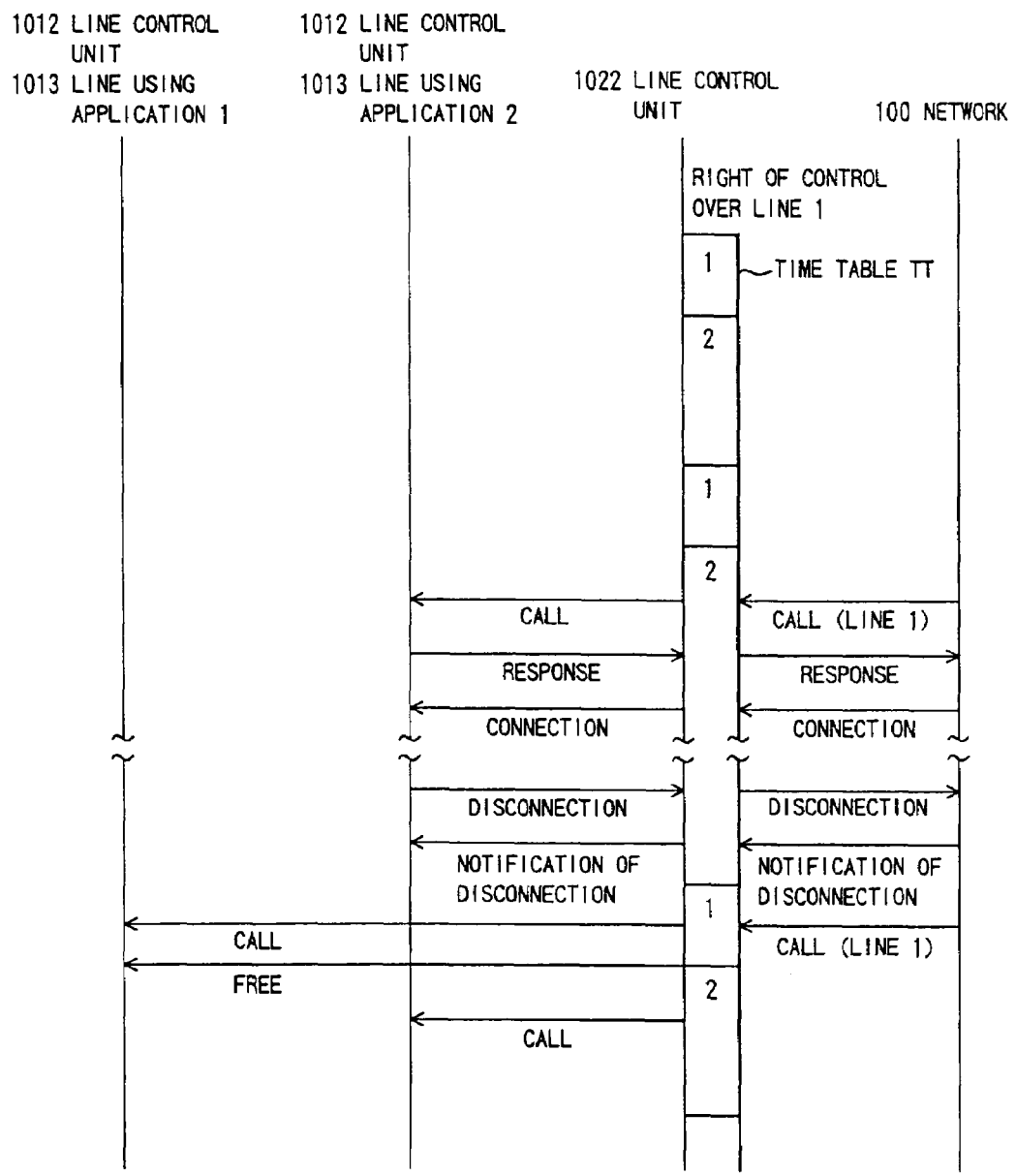
FIG. 7 is an explanatory sequence chart showing an operational example 5.

Next, an operational example 5 will be discussed referring to FIGS. 1, 2 and 7 in combination. A scheme is not that the control data about the communication occurred on each of the computer terminal 101 are communicated with the line control unit 1012 of other computer terminal 101, but that a terminal 102 for the centralized management is provided, the line control data are transmitted to and received from the centralized management terminal 102 via the lines from the respective computer terminals, the line control unit 1022 within the centralized management terminal 102 has time tables TT for control per line and per terminal, and, after judging whether the requesting-side computer terminal 101 or the communication line utilizing hardware/software module 1013 has the right of control when receiving the control data, the processing is executed for the network 100.

If having no right of control, a purport of being unacceptable is sent back to the line control unit 1011 of the computer terminal 1012. A method of allocating the controllable computer terminals 101 or communication line utilizing hardware/software modules 1013 according to the respective lines, is that the line control unit 1022 of the centralized management terminal 102 does weighting for every computer terminal 101 or communication line utilizing hardware/software module 1013 on the basis of a table 1023 as shown in FIG. 2.

As in the operational example 4, in the mode of determining which communication line utilizing hardware/software module 1013 is given the right of controlling a specified line among the respective terminals as well as in the case of not using this mode (the processing authority is equal between the terminals), the exclusive control to obviate the processing conflict, etc. can be executed with respect to synchronous processes for the same communication.

Describing it in greater details, the configuration of the lines connected to the respective computer terminals is the same as that in the operational example 2, and the line control unit 1022 of the computer terminal, i.e., of the centralized management terminal 3 is to implement the centralized management. Now, if the call occurs on the line 1, the Line control units 1012 of the computer terminals 1, 2 notify the self-terminal communication line utilizing hardware/software module 1013 of the call.

If the communication line utilizing hardware/software modules 1013 of the computer terminals 1, 2 simultaneously issue the response requests to the line control unit 1022 of the computer terminal 3 via the self-terminal line control units 1012, the line control unit 1022 of the computer terminal 3 allocates by time sharing a controllable length of time to each of the computer terminals with respect to the right of control of the line 1, and the computer terminal receiving the control request at that timing is made capable of controlling the line. With this mode being taken, the response accept is repeated for the computer terminal 1, and the impossible-of-response indication is repeated for the computer terminal 2.

In this case, as for the time allocated by time sharing, a time interval is determined based on the priority given to each terminal per line with reference to the communication control management table 1023 managed by the line control unit 1022 of the computer terminal 3.

OPERATIONAL EXAMPLE 6

Figure 8:
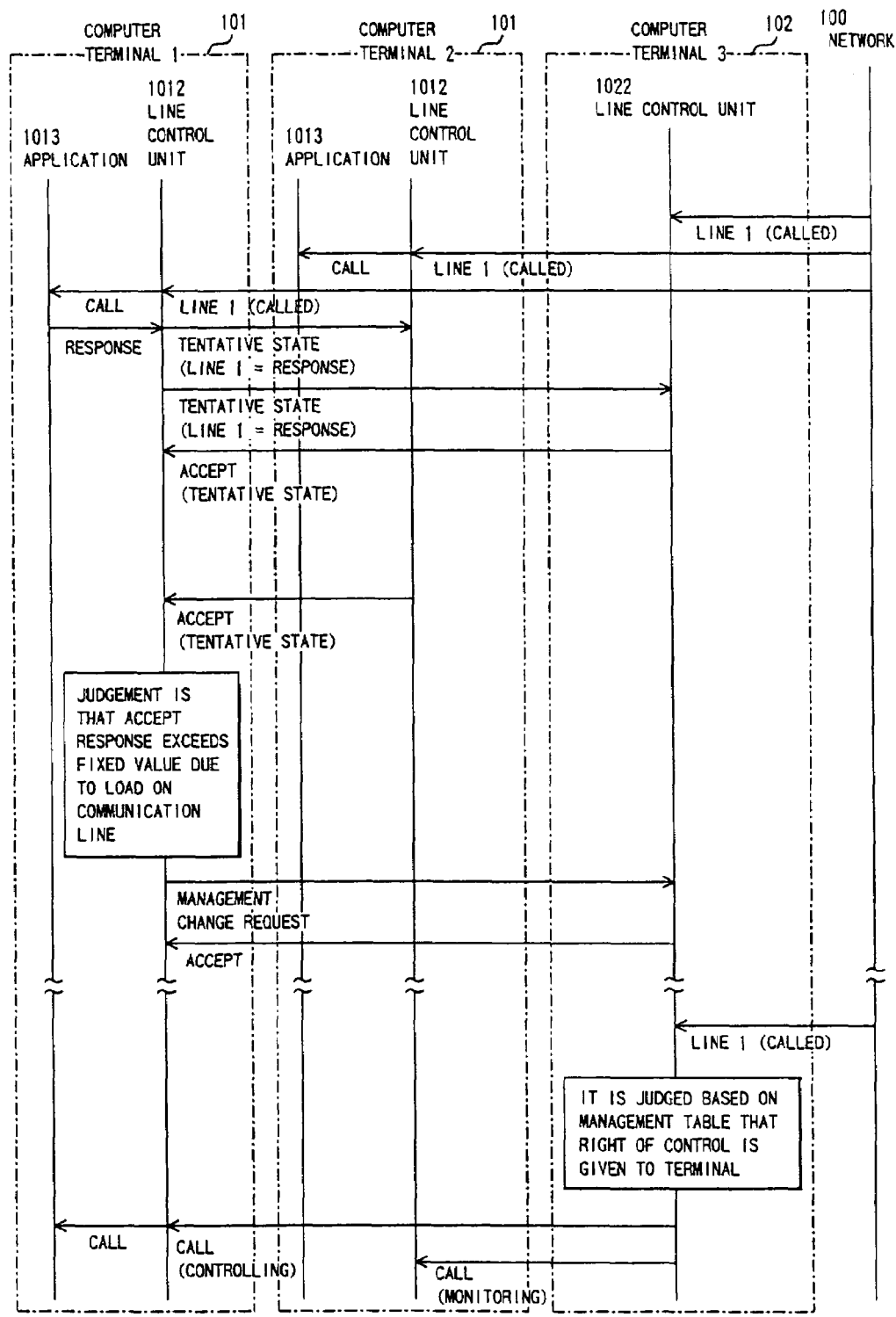
FIG. 8 is an explanatory sequence chart showing an operational example 6.

Next, an operational example 6 will be explained referring to FIGS. 1, 2 and 8 in combination. The state is periodically monitored between the communication line utilizing hardware/software module 1013 and the line control unit 1012 in each computer terminal 101. In a case where the line control unit 1012 recognizes a change in the state of the communication line utilizing hardware/software module 1013 due to, e.g., a hang-up, etc. of the communication line utilizing hardware/software module 1013 and a case where the response is delayed from preset response timing, the line control unit 1012 judges an optimal terminal among other computer terminals 101 by utilizing the function in the operational example 4 and prompts the control by giving a notification of being impossible of response as a tentative state, or the mode of managing the lines accommodated in the terminal concerned is switched over to the distributed management (the operational example 4) or to the centralized management (the operational example 5). Moreover, the management mode may be switched over corresponding to a communication load with the line control unit 1012 of other terminal.

Further, when the control is done by the line control unit 1022 of the centralized management terminal 102, it is switched over whether each terminal implements the distributed control corresponding to an internal processing load of the centralized management terminal 102 as well as to a load of an unillustrated network (the data lines as in LAN) for performing the communications with the individual computer terminals 101.

To give a more detailed description, to begin with, as to the control of the lines CL connected to the terminal 1, the distributed control is carried out by the mode demonstrated in the operational example 4, and all other terminals are tentatively notified of the state if the state might change. On the other hand, the communication line utilizing hardware/software module 1013 and he line control unit 1012 in the computer terminal 1 periodically communicate with each other in order to monitor the mutual states, and a response timing is monitored at the same time.

Furthermore, the communication load is monitored based on the response in connection with the transmission/receipt of the state notification including the tentative state to and from other terminal. Now, if the communication load exceeds a response value preset in the management table 1015 of the line control unit 1012 in the transmission/receipt of the state notification to and from other terminal, the centralized management terminal 3 is notified of the state so that the management of the lines dealt with by the self-terminal is switched over to the centralized management, and also notified of a request for the line control. Thereafter, if the communication occurs on the line related to the computer terminal 1, the centralized management terminal 3 controls the line.

OPERATIONAL EXAMPLE 7

Figure 9:
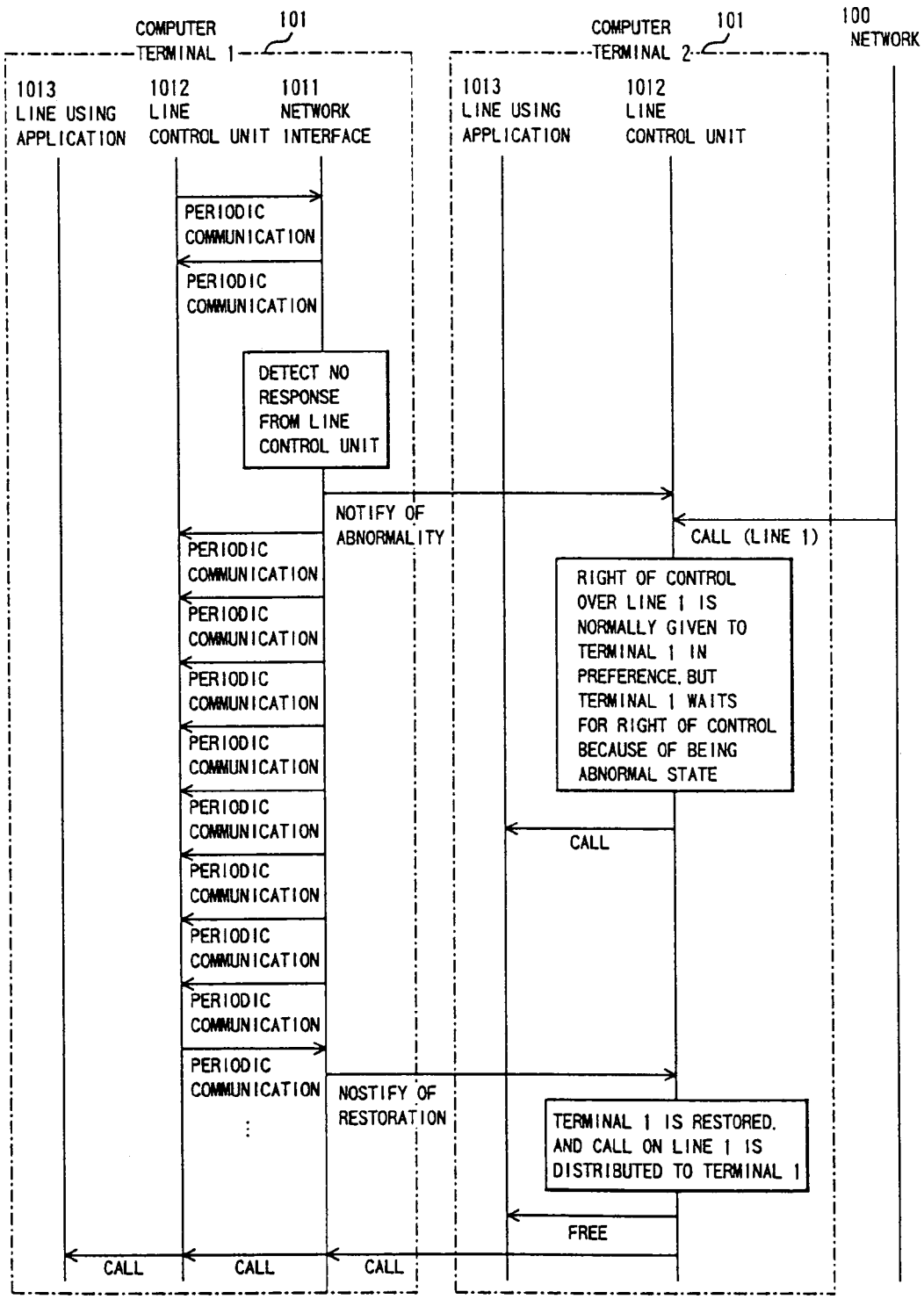
FIG. 9 is an explanatory sequence chart showing an operational example 7.

Next, an operational example 7 will be discussed referring to FIGS. 1, 2 and 9 in combination. If the line control unit 1012 of the computer terminal 101 falls into an inoperable state such as a cut-off of the power source of the computer terminal 101, the network interface 1011 operable by a power supply from the network 100 and a local power supply notifies other terminal of the state, thus changing the line control mode.

In this case also, as in the operational example 6, the network interface 1011 detects a state of the line control unit 1012 by the periodic state monitoring between the line control unit 1012 and the network interface 1011. The line control mode is changed by notifying of the change in state also when reverting to the normal state.

To describe it in farther depth, the computer terminal 1 checks the state by performing the periodic communications between the network interface 1011 and the line control unit 1012. The network interface 1011 is operable by a power supply (e.g., a power supply from the network 100, a local AC power supply, etc.) different from the power supply by which the computer terminal body is operated.

In this case, if the line control unit 1012 becomes inoperable due to the cut-off of the power supply of the computer terminal 1, the network interface 1011 detects an abnormal state because of no response from the line control unit 1012, and gives a notification of fault of the computer terminal 1 to the line control units 1012 of other computer terminals 2.

Thereafter, if the communication (such as a telephone call) occurs on the line CL connected to the computer terminal 1, the computer terminal 1 is incapable of controlling the line and is therefore ruled out of the category of the control-assigned terminal in the management table 1015 shown in FIG. 2, and the same line 1 may be controlled by the line control unit 1012 of other computer terminal 2. After being restored, the network interface 1011 of the computer terminal 1 re-notifies of the restoration the line control units 1012 of the respective computer terminals, and the computer terminal 1 thus becomes a control-assigned terminal.

MODIFIED EXAMPLE

In the communication line control system described above, the centralized management terminal 102 has the different configuration from the computer terminal 101, however, it may also be feasible to take the same configuration oriented beforehand to the centralized management. The illustration of the network interface for the communications between the line control units of the respective terminals via the different network (LAN, PBX), is herein omitted. The number of the communication lines accommodated in each of the terminals may be different or the same. The network 100 may be constructed of an intercommunicating network such as PBX.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. A communication line control method comprising:
providing a plurality of communication terminal devices each incorporating communication functions containing voice communications and data communications, accommodating a plurality of communication lines connected to a network, and capable of controlling an arbitrary call;
causing, if said plurality of communication terminal devices forming a plurality of groups and when a control request with respect to a specified call is made on an arbitrary communication terminal device within one group or when a state of the call changes, a line control unit of said arbitrary communication terminal device to give broadcasting notifications of a change in control reservation state with respect to the specified call to said line control units of said plurality of communication terminal devices within other groups;
causing said line control unit of said arbitrary communication terminal device, after receiving acknowledgements about the control reservation state from said line control units, having received the broadcasting notifications, of said communication terminal devices within other groups, to give a right of control of the call to a distributed control module of said arbitrary communication terminal device that utilizes the communication lines; and
causing said distributed control module of said arbitrary communication terminal device to execute exclusive control between said communication terminal devices within other groups by unifying the states about the specified call between said communication terminal devices of other groups without being aware of the communication lines.

2. A communication line control method comprising:
providing a plurality of communication terminal devices each incorporating communication functions containing voice communications and data communications, accommodating a plurality of communication lines connected to a network, and capable of controlling an arbitrary call;
setting one arbitrary communication terminal device as a centralized management communication terminal device of which a line control unit manages in centralization said other communication terminal devices;
allocating, when controlling a specified call by said other communication terminal devices, a right of control to said other communication terminal devices by said centralized management communication terminal device on the basis of preset condition data;
causing a distributed control module of said arbitrary communication terminal device to execute exclusive control between said other communication terminal devices that utilize the communication by unifying the states about the specified call between said other communication terminal devices without being aware of the communication liner;
monitoring a processing load within a self communication terminal device and a load on the communication line in said line control unit of each of said communication terminal devices or in said line control unit of said centralized management communication terminal device; and managing a plurality of calls by switching over a mode of the line control in said line control unit of each of said communication terminal devices or in said line control unit of said centralized management communication terminal device on the basis of the condition data preset corresponding to a state of this load.

3. A communication line control method comprising:

providing a plurality of communication terminal devices each incorporating communication functions containing voice communications and data communications, accommodating a plurality of communication lines connected to a network, and capable of controlling an arbitrary call;

causing, if said plurality of communication terminal devices forming a plurality of groups and when a control request with respect to a specified call is made on an arbitrary communication terminal device within one group or when a state of the call changes, a line control unit of said arbitrary communication terminal device to give broadcasting notifications of a change in control reservation state with respect to the specified call to said line control units of said plurality of communication terminal devices within other groups;

causing said line control unit of said arbitrary communication terminal device, after receiving acknowledgements about the control reservation state from said line control units, having received the broadcasting notifications, of said communication terminal devices within other groups, to give a right of control of the call to a distributed control module of said arbitrary communication terminal device that utilizes the communication lines;

causing said distributed control module of said arbitrary communication terminal device to execute exclusive control between said communication terminal devices within other groups by unifying the states about the specified call between said communication terminal devices of other groups without being aware of the communication lines;

monitoring a processing load within a self communication terminal device and a load on the communication line in said line control unit of each of said communication terminal devices or in a line control unit of a centralized management communication terminal device; and managing a plurality of calls by switching over a mode of the line control in said line control unit of each of said communication terminal devices or in said line control unit of said centralized management communication terminal device on the basis of a condition data preset corresponding to a state of this load.

4. A communication line control system comprising:

a plurality of communication terminal devices each incorporating communication functions containing voice communications and data communications, accommodating a plurality of communication lines connected to a network, and capable of controlling an arbitrary call;

wherein if said plurality of communication terminals form a plurality of groups and when a control request with respect to a specified call is made on an arbitrary communication terminal device within one group or when a state of the call changes, a line control unit of said arbitrary communication terminal device gives broadcasting notifications of a change in control reservation state with respect to the specified call to said line control units of said plurality of communication terminal devices within other groups, said line control unit of said arbitrary communication terminal device, after receiving acknowledgements about the control reservation state from said line control units, having received the broadcasting notifications, of said communication terminal devices within other groups, gives a right of control of the call to a distributed control module of said arbitrary communication terminal device that utilizes the communication lines, and said distributed control module thus executes exclusive control between said communication terminal devices within other groups.

5. A communication line control system comprising:

a plurality of communication terminal devices each incorporating communication functions containing voice communications and data communications, accommodating a plurality of communication lines connected to a network, and capable of controlling an arbitrary call, wherein when a line control unit of one arbitrary communication terminal device manages in centralization said other communication terminal devices, said centralized management communication terminal device allocates, in the case of controlling a specified call by said other communication terminal devices, a right of control to said other communication terminal devices on the basis of preset condition data, a distributed control module of said arbitrary communication terminal device utilizing the communication lines executes exclusive control between said communication terminal devices by unifying the states about the specified call between said other communication terminal devices without being aware of the communication lines;

wherein said system is capable of monitoring a processing load within a self communication terminal device and a load on the communication line in said line control unit of each of said communication terminal devices or in said line control unit of said centralized management communication terminal device, and managing a plurality of calls by switching over a mode of the line control in said line control unit of each of said communication terminal devices or in said line control unit of said centralized management communication terminal device on the basis of the condition data preset corresponding to a state of this load.

* * * * *

UNITED STATES PATENT AND TRADEMARK OFFICE
CERTIFICATE OF CORRECTION

PATENT NO. : 7,266,129 B1 Page 1 of 1
APPLICATION NO. : 09/661737
DATED : September 4, 2007
INVENTOR(S) : N. Ohsawa It is certified that error appears in the above-identified patent and that said Letters Patent is hereby corrected as shown below:

Title Page, Item (56) the following documents need to be added to the References Cited:

--(56)  References Cited

U.S. PATENT DOCUMENTS 5,134,652
5,852,405--

(2) Column 14, line 64: "Commnication liner;" should be indicted as
-- --communication lines;-- --.

Signed and Sealed this

Eleventh Day of December, 2007

JON W. DUDAS
*Director of the United States Patent and Trademark Office*